United States Patent [19]

Schmidt

[11] Patent Number: 5,209,286

[45] Date of Patent: May 11, 1993

[54] GROUND OPEN-AIR HEAT EXCHANGE, OPEN-AIR CONDITIONING SYSTEM, AND METHOD

[76] Inventor: James D. Schmidt, P.O. Box 454, Brewster, Mass. 02631

[21] Appl. No.: 840,037

[22] Filed: Feb. 24, 1992

[51] Int. Cl.[5] .................... F28D 21/00; F25D 9/00
[52] U.S. Cl. ........................................ 165/45; 62/260
[58] Field of Search ................ 165/2, 45, 3; 62/260

[56] References Cited

U.S. PATENT DOCUMENTS

| | | | |
|---|---|---|---|
| 654,264 | 7/1900 | Lueder et al. | 62/260 X |
| 4,128,204 | 12/1978 | Wade | 237/1 A |
| 4,234,037 | 11/1980 | Rogers et al. | 165/3 |
| 4,279,291 | 7/1981 | Lambert | 165/1 |
| 4,323,113 | 4/1982 | Troyer | 165/45 |
| 4,384,609 | 5/1983 | Neuzil | 165/45 |
| 4,674,561 | 6/1987 | Kelley | 165/45 |

Primary Examiner—Allen J. Flanigan
Attorney, Agent, or Firm—Thomas A. Kahrl

[57] ABSTRACT

An underground air conditioning apparatus for underground cooling outside air directed into a space comprising an open-air inlet for admitting outside air including air quality control apparatus including an above ground intake and a below ground outlet manifold, a blower for creating positive air pressure, a well means for providing an enlarged conduit for conducting the admitted air below the ground surface to a heat exchanger apparatus positioned underground and surrounded by soil segment, earth-embedded conduit means for exchanging thermal energy between the admitted air and the earth said earth conduit, extending underground between the well means and the space including a plurality of open-air tubes arranged in a tier in a common plane buried in the earth having an inlet end and an outlet end. Also included are inlet manifold means for distributing the outside air through a plurality of ports to the inlet end of the tier of tubes laid underground and outlet manifold apparatus for collecting the cooled air pumped through the open-air tubes via a plurality of outlet ports communicating with the open-air tubing; laid underground connected to sensing devices for detecting inlet pressure and outlet pressure, poor quality conditions and inlet and outlet temperature; and switch apparatus for directing the path of the incoming air by detecting the coolest heat exchanger path volume and path.

14 Claims, 2 Drawing Sheets

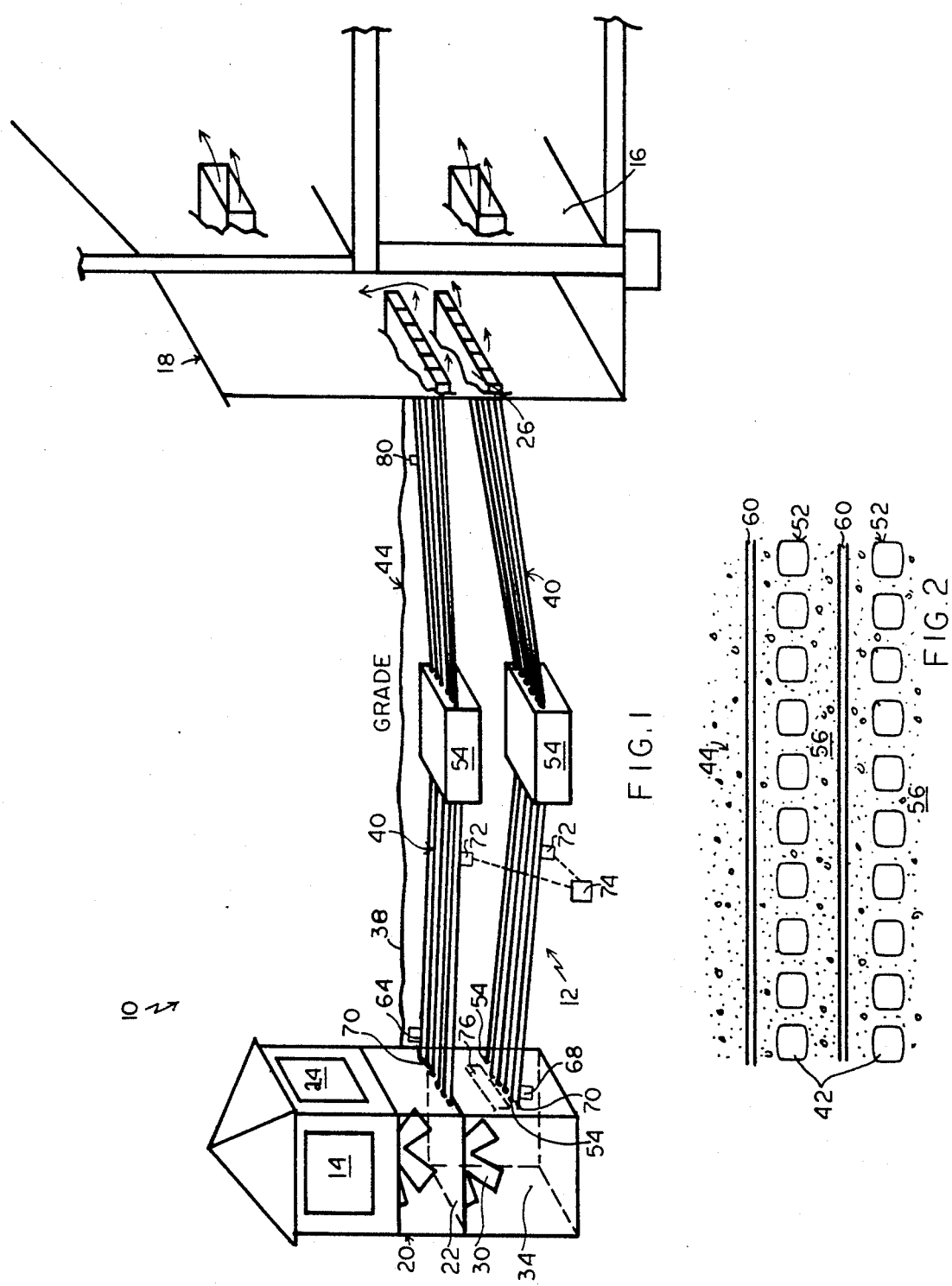

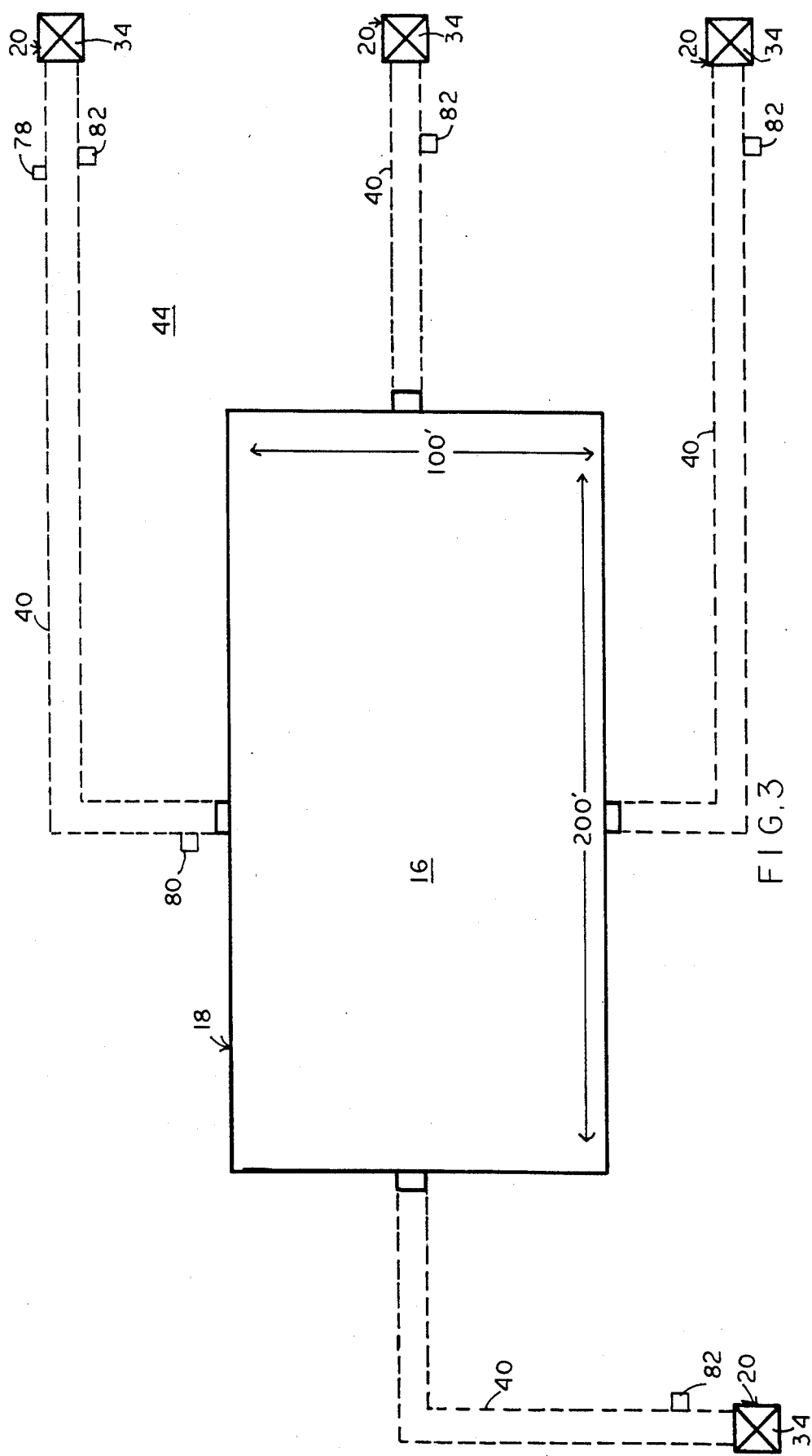

GROUND OPEN-AIR HEAT EXCHANGE, OPEN-AIR CONDITIONING SYSTEM, AND METHOD

BACKGROUND OF THE INVENTION

Air conditioning large commercial or industrial structures historically was accomplished by circulating large volumes of air by means of fans positioned to exhaust the interior hot air through an elevated opening, and by drawing in cooler outside air through openings in the walls of the structure, often through open windows. Such systems provided little, if any, control of the quality of the incoming air, and provided only limited relief from extreme heat as the air being drawn in was hot to start with, and moreover, depending on the nature of the commercial or industrial activity and machinery utilized, such activity very often generated considerable heat as well to the interior spaces of the building. As a consequence manufacturing operations historically were typically located in temperate areas to avoid "sweat shop" conditions during the heat of the summer months.

With the advent of cheap and abundant electricity, cooling of large buildings by electrically operated air conditioning systems became feasible and has been widely used. Though often requiring a substantial amount of electrical power during periods of high temperatures, i.e. daily temperatures exceeding 90 degrees Fahrenheit, air condition systems have become popular in temperate zones, and have permitted relocation of an increasing number of commercial and manufacturing operations to the so-called "sun belt", to enjoy the benefits of a mild winter without the having to suffer the summer "sweat shop" conditions.

More recently, two conditions affecting electrical power have had an adverse effect on air conditioning large structures, particularly in the so-called "sun belt" localities. The first is that the cost of peak load power has risen dramatically, making air conditioning at peak load periods which coincide with the times of extreme heat very costly. Secondly, shortages of power now exist in selected areas of the country due to lack of generating capacity necessitating rationing of peak power and low power at peak load conditions experienced during periods of excess heat. The net result of these two conditions is that increasingly, commercial facilities are curtailing use of air conditioning during times of extreme heat, to the detriment of the working conditions for their employees, and at certain risk to stored or warehoused goods due to extreme heat and risk of associated fire.

It is therefore desirable to provide for an improved open-air heat exchange apparatus in combination with an air conditioning system to provide reliable, low cost air conditioning for large spaces utilizing an underground heat exchange system having controls to insure improved air quality.

SUMMARY OF THE INVENTION

The invention relates to an open-air heat exchanger installed underground, to an open-air economizer for an air conditioning system and to a method of conditioning outside air with an underground heat exchanger. In particular, the invention concerns an open-air air conditioning apparatus having a heat exchanger installed underground for use with large commercial or industrial buildings situated on open land, said heat exchanger employing thin-walled, open-air conduit piping with air quality control devices for furnishing low cost and low energy air conditioning.

The present invention provides for a positive pressure head at the inlet for directing the outside incoming air downwardly into the main shaft of the inlet well through the respective control manifolds, through the open conduit apparatus consisting of multiple tiers of open-air thin walled tubing and vents into selected areas of the structure. The advantage of providing the positive head at the inlet is directed to maintaining a positive pressure throughout the heat exchanger conduit tubing to prevent degradation of the quality of the incoming air from contamination by sources such as radon gas, fumes from hazardous materials carrying carcinogenic elements, obnoxious odors, and insect and biological intrusion into the system. Furthermore, inasmuch as quality control devices such as a filtration apparatus, is installed at the inlet end down stream of the pressure head apparatus, and in view of the fact that such filtration apparatus causes a pressure drop in the system, the pressure head can't be maintained to compensate for the pressure drop. A control device therefore is provided to regulate the sensors at the outlet of the heat exchanger and the inlet end for regulating the outlet pressure of the fan apparatus to insure a positive flow of air conditioned air from the heat exchanger into the interior space of the building. The control mechanism is also useful for accommodating two modes of operation for the open-air air conditioning apparatus.

The first mode of operation in the preferred embodiment for air conditioning the structure solely by the open-air air conditioning system wherein the heat of the incoming air is reduced by the underground heat exchanger to produce cooled, dry air, conditioned air, with provision for a sump with drain apparatus for condensing and withdrawing and thereby dehumidifying incoming air as it is cooled in the heat exchanger.

The second mode or "air conditioning" mode of operation of the present invention is in a second embodiment, whereby the open-air heat exchanger apparatus is used as an economizer to provide at its outlet, whose outlet is connected to the inlet of a closed loop interior electrically powered air conditioning system for the purposes of operating at extreme temperatures, either high or low, to reduce heat peak loading of the closed loop air conditioning system using conventional water tower cooling or refrigerate boils for cooling and conventional furnace elements for heating as needed.

In particular, incoming air flows into the inlet end of the inlet apparatus, said apparatus including a generally vertically oriented well having exterior walls, typically of a rectangular configuration having an interior shaft having interior dimensions of at least six by four feet in the preferred embodiment, a roof element for keeping water and debris out of the shaft, a blower apparatus found adjacent the incoming end connected to a conventional control device for adjusting the output pressure of the blower apparatus. An air quality control apparatus mounted down stream in the shaft from the blower apparatus, typically includes conventional filtration elements. Optionally, a manifold may be provided in the inner wall adjacent the structure of the shaft for controlling the flow of air to selected tiers of the conduit tubing. The manifold is connected to actuating apparatus for movement between an open and closed position responsive to signals generated by the control mechanism connected to the manifold. A sensing element is provided at the incoming end of each tier of conduit piping and at the outlet end, both sensors being connected to the lower control apparatus. The conduit sensors permit the blower to be regulated to ensure that there is always a positive head on outside air flowing through the heat exchanger tiers to prevent a negative pressure condition from occurring within the conduit piping which would otherwise tend to draw in gases from the subsoil in which the heat exchanger is buried.

The heat exchanger apparatus includes thin wall metallic tubing in the preferred embodiment having a wall thickness of 0.019" constructed of aluminum and having an interior cross section of not less than 2 inches by 3 inches and extends from the inner wall of the well to the manifold area of the wall of the structure adjacent the well. The tubing is arranged in tiers of a series of tubing aligned in a coplanar relationship, the series typically numbering 20 to 30 tubes having a length varying according to the heat flow of the structure selected adapted to be buried underground in a ground segment extending outwardly from the foundation wall of the structure. The tubing is typically buried at least 5 to 6 feet underground and may be laid in multiple layers arranged in spaced apart relationships, separated by panels for segregating and stabilizing during installation. The tiers, typically consisting of ⅝" gypsum board with up to a total length of 3,500 feet of tubing for the entire system, have variations to accommodate differing conditions.

In another embodiment, each tier of tubing is provided with a separate inlet manifold and outlet manifold and separate control for opening and closing said manifolds.

Air quality control apparatus is provided in communication with the heat exchanger for introducing conventional insecticide and disinfectant and anti-biological compounds for controlling the air quality of the incoming outside air passing through the heat exchanger apparatus.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 1 is a schematic, illustrative, partially sectionalized drawing of a underground, open-air heat exchange apparatus of the invention installed showing a structure in section;

FIG. 2 is a section along lines 2—2 of FIG. 1 showing two tiers of open-air tubing arranged in a series with an intermediate panel boundary layer, of the invention employed in FIG. 1; and FIG. 3 is a top plan view of a structure with a plurality of underground, open-air, heat exchange apparatus position adjacent each exterior wall of the invention employed in FIG. 1.

DETAILED DESCRIPTION OF THE PREFERRED EMBODIMENT

With reference to the drawings, there is shown an open-air air conditioning system 10 including an underground air conditioning apparatus 12 for admitting outside air 14 directed into a space 16 in a structure 18, provided with an open-air inlet 20 including an air quality screen 22 and having an above ground intake 24 and a below ground outlet manifold 26. A blower 28 having a fan blade 30 is mounted in the open-air inlet 20 adjacent an intake 32, said inlet 20 including a well 34 having a shaft 36 connecting the intake 24 to the outlet manifold 26 positioned below the ground surface 38 to a heat exchanger 40.

The structure 18 is surrounded by a ground segment 44 for embedding one or more heat exchangers 40 as shown in FIG. 3, underground for air conditioning the outside open-air 14 directed by the blower 28 through the heat exchanger 40 to the space 16.

The heat exchanger 40 includes a plurality of earth-embedded open-air tubes 42 having thin-walled casing 48 in contact with the earth in ground segment 38 extending underground between the well 34 and an adjacent wall 50 of structure 18. Typically the shaft 36 of the well 24 is of generally rectangular construction with a plurality of walls including an inner wall 58. As shown in FIG. 2 the open-air tubes 42 are arranged in a tier 52 in a common plane buried in the earth having an inlet end and an outlet end, and a sump 54 provides a drain for condensate formed on the interior of the open-air tubing positioned at a central position shown in FIG. 1. As shown in FIG. 2 the tiers 52 are embedded underground surrounded by the strata layers of earth 56 for surrounding the open-air tubes 42 with an ambient temperature cooler than the incoming air 14 in summer for cooling, and warmer than said incoming air in the winter for warming.

In the preferred embodiment of the invention, the open-air tubes 42 consist of a plurality of thin-walled metallic open-air tubes positioned in direct contact with the ground at a depth of greater than five feet, are disposed in a common horizontal plane as shown in FIG. 2 and including a plurality of tiered layers, each layer comprising a series of open-air tubes arranged in parallel relationship in a common plane, and each tube is constructed of metal having a high conductivity and is corrosion resistant, typically aluminum tubular drain piping.

As shown in FIG. 2, the ground segment 44 includes divider panels 60 means for segregating and stabilizing multiple tiers 52 of tubing in respective strata of soil.

Also in the preferred embodiment the underground air conditioning apparatus 12 includes a variety of air quality control devices to provide protection against contamination, insect control adapters 64 for introducing chemicals to the heat exchanger 40 for controlling insects, and providing screens 22 in the shaft 36, and providing biological control apparatus 68 adjacent the open-air tubing for control of growth of biological species.

As further shown in FIG. 1, the inlet manifold 54 is positioned at the base of the wall 58 and is adapted to distribute the outside air through a plurality of ports 70 connected to the inlet end of the tier 52 of tubes laid underground. The outlet manifold 26 positioned on the outlet end of the tier 52 collects the air conditioned air pumped through the open-air tubes communicating with the open-air tubing 42 laid underground.

A plurality of multiple-function sensors 72 of conventional construction adapted to measure and report to a central control module 74 the inlet pressure and outlet pressure, as well as poor quality conditions and inlet and outlet temperature of the air conditioning apparatus 12. Also connected to the control module is switching apparatus 76 adapted to direct the path of the incoming air by detecting the coolest heat exchanger path volume and path and selectively open and close inlet manifolds 54 of selected tiers 52.

As shown in FIG. 3, one or more heat exchanger inlet 78 and outlet 80 sensors are provided and are controlled with a blower apparatus manifold control device 82, conventional flows through interior air conditioned system, as well as a conventional filter apparatus, blower apparatus, sump apparatus in the heat exchanger, water withdrawal apparatus, air quality control injection apparatus, and air quality sensing apparatus including an alarm device, which is well known in the art.

What is claimed is:

1. An underground air conditioning apparatus adapted for underground cooling of outside air directed into an interior space comprising:
   a) inlet means for admitting outside air including air quality screening means, comprising an above ground intake and a below ground outlet manifold;
   b) blower means for acting on the admitted outside air creating positive air pressure, positioned in the inlet means;
   c) well means for providing an enlarged conduit for conducting the admitted air from the inlet means to a heat exchanger means;
   d) a ground soil segment positioned between the open-air inlet means and the interior space;
   e) heat exchanger means positioned underground in the soil segment for air conditioning outside outside-air directed by the blower means inwardly to the interior space comprising:
      earth-embedded conduit means for exchanging thermal energy between the admitted outside air and the earth, having an inlet end and an outlet end;
   f) sensing means for detecting inlet pressure and outlet pressure, poor quality conditions and inlet and outlet temperature; and
   g) switch means for changing the path of the incoming air by detecting the coolest heat exchanger path volume and path.

2. The underground air conditioning apparatus of claim 1 wherein the heat exchanger means comprises a:
   a) inlet manifold means for distributing the outside air through a plurality of ports to the inlet end of a plurality of tiers of open-air tubes laid underground and;
   b) outlet manifold means for collecting the cooled air pumped through the open-air tubes via a plurality of outlet ports communicating with the open-air tubing laid underground.

3. The underground air conditioning apparatus of claim 1 wherein the heat exchanger means includes a sump means for removing condensed moisture from the interior of the open-air tubes to provide dehumidified air conditioned air.

4. The underground air conditioning apparatus of claim 1 wherein the earth-embedded conduit means is embedded underground surrounded by a plurality of strata layers of soil in the ground segment means for cooling by heat exchange.

5. The underground air conditioning apparatus of claim 1 wherein the heat exchanger means provides cooling air conditioning.

6. The underground air conditioning apparatus of claim 1 wherein the heat exchanger means provides heating air conditioning.

7. The underground air conditioning apparatus of claim 1 wherein the blower means includes powered fan means for directing the flow of air inwardly from the intake to the interior space.

8. The underground air conditioning apparatus of claim 1 wherein well means comprises a vertical shaft of generally rectangular construction with a plurality of walls including an inner wall for providing a passage from above ground to a underground location.

9. The underground air conditioning apparatus of claim 2 wherein the fan blade means is positioned adjacent the intake.

10. The underground air conditioning apparatus of claim 2 wherein the earth embedded conduit means comprises a plurality of thin-walled metallic open-air tubes.

11. The underground air conditioning apparatus of claim 2 wherein the earth embedded conduit means comprises conduit means extending underground between the well means and the space including a plurality of open-air tubes arranged in a tier in a common plane buried in the earth.

12. The underground air conditioning apparatus of claim 1 wherein the open-air tubes are contained in a plurality of tiered layers, each layer comprising a series of open-air tubes arranged in parallel relationship in a common plane.

13. The underground air conditioning apparatus of claim 12 wherein the open-air tubes are constructed of aluminum metal having a high conductivity and is corrosion resistant.

14. The underground air conditioning apparatus of claim 1 wherein the ground segment includes divider means for segregating multiple tiers of tubing in respective strata of soil comprising a plurality of divisional boundary panels.

* * * * *